US011021397B2

(12) United States Patent
Mouazen et al.

(10) Patent No.: US 11,021,397 B2
(45) Date of Patent: Jun. 1, 2021

(54) BITUMEN WHICH IS SOLID AT AMBIENT TEMPERATURE

(71) Applicant: TOTAL MARKETING SERVICES, Puteaux (FR)

(72) Inventors: Mouhamad Mouazen, Nanterre (FR); Laurence Lapalu, Villeurbanne (FR)

(73) Assignee: TOTAL MARKETING SERVICES, Puteaux (FR)

( * ) Notice: Subject to any disclaimer, the term of this patent is extended or adjusted under 35 U.S.C. 154(b) by 66 days.

(21) Appl. No.: 16/304,243

(22) PCT Filed: May 22, 2017

(86) PCT No.: PCT/FR2017/051263
§ 371 (c)(1),
(2) Date: Nov. 23, 2018

(87) PCT Pub. No.: WO2017/203154
PCT Pub. Date: Nov. 30, 2017

(65) Prior Publication Data
US 2019/0352229 A1 Nov. 21, 2019

(30) Foreign Application Priority Data

May 23, 2016 (FR) ...................... 16 54580

(51) Int. Cl.
C04B 26/26 (2006.01)
C04B 24/04 (2006.01)
C04B 24/12 (2006.01)
C04B 20/10 (2006.01)
E01C 7/20 (2006.01)
C04B 111/00 (2006.01)

(52) U.S. Cl.
CPC .......... *C04B 26/26* (2013.01); *C04B 20/1044* (2013.01); *C04B 24/04* (2013.01); *C04B 24/124* (2013.01); *E01C 7/20* (2013.01); *C04B 2111/0075* (2013.01)

(58) Field of Classification Search
None
See application file for complete search history.

(56) References Cited

U.S. PATENT DOCUMENTS

| 3,026,568 A | 3/1962 | Moar |
| 3,035,930 A | 5/1962 | Talley |
| 5,693,130 A | 12/1997 | Janicki et al. |
| 5,713,130 A | 2/1998 | Fukuda et al. |
| 5,713,996 A | 2/1998 | Morris et al. |
| 5,880,185 A | 3/1999 | Planche et al. |
| 7,918,930 B2 | 4/2011 | Lapalu et al. |
| 2004/0186188 A1 | 9/2004 | Van Berge et al. |
| 2010/0056669 A1* | 3/2010 | Bailey ..................... C08L 95/00 523/201 |
| 2011/0115116 A1* | 5/2011 | De Amorim Novais Da Costa Nobrega ....... B29C 48/04 264/210.1 |
| 2011/0290695 A1 | 12/2011 | Thomas |
| 2012/0123028 A1 | 5/2012 | Dreesen et al. |
| 2013/0041075 A1* | 2/2013 | Harders ................... C08K 5/20 524/68 |
| 2017/0218177 A1 | 8/2017 | Vincent et al. |

FOREIGN PATENT DOCUMENTS

| EP | 0 199 475 A1 | 10/1986 |
| EP | 1 432 778 B2 | 8/2010 |
| FR | 3 024 454 A1 | 2/2016 |
| WO | 97/14753 A1 | 4/1997 |
| WO | 02/26889 A1 | 4/2002 |
| WO | 02/31083 A2 | 4/2002 |
| WO | 2007/058994 A2 | 5/2007 |
| WO | 2008/137394 A1 | 11/2008 |
| WO | 2009/153324 A1 | 12/2009 |
| WO | 2011/013073 A1 | 2/2011 |
| WO | 2012/168380 A1 | 12/2012 |

OTHER PUBLICATIONS

Tartari, Edith, "Natural Bitumen—the Perfect Additives for High-Performance Asphalt Mixes," Second Serbian Road Congress, Jun. 9-10, 2016.
Sep. 22, 2017 International Search Report issued in International Patent Application No. PCT/FR2017/051263.
Sep. 22, 2017 Written Opinion of the International Searching Authority issued in International Patent Application No. PCT/FR2017/051263.

* cited by examiner

Primary Examiner — Yong L Chu
(74) Attorney, Agent, or Firm — Oliff PLC

(57) ABSTRACT

Bitumen which is solid at ambient temperature, in the form of granules including a core made of a first bituminous material and a coating layer made of a second bituminous material, in which: the first bituminous material includes at least one bitumen base and the second bituminous material includes: at least one bitumen base and at least one chemical additive chosen from: an organic compound, a viscosifying compound, a paraffin, a polyphosphoric acid and mixtures thereof; or at least one pitch having a ring-and-ball softening point (RBSP) greater than or equal to 80° C., it being understood that the RBSP is measured according to the EN 1427 standard; or a mixture of these materials.

17 Claims, No Drawings

BITUMEN WHICH IS SOLID AT AMBIENT TEMPERATURE

TECHNICAL FIELD

The present invention relates to a road bitumen in divided form, which is solid at ambient temperature. The present invention also relates to a process for preparing road bitumen at ambient temperature and also to the use thereof as road binder, especially for manufacturing bituminous mixes.

The present invention also relates to a process for manufacturing bituminous mixes from solid bitumen according to the invention and also to a process for transporting and/or storing road bitumen that is solid at ambient temperature according to the invention.

PRIOR ART

Bitumen is used in the vast majority in construction, mainly for the manufacture of roadways or in industry, for example in roofing applications. It is generally in the form of a black material that is highly viscous, or even solid at ambient temperature, which liquefies on heating.

In general, bitumen is stored and transported hot, in bulk, in tank trucks or by boat at high temperatures of the order of 120° C. to 200° C. However, the storage and transportation of hot bitumen presents certain drawbacks. Firstly, the transportation of hot bitumen in liquid form is considered hazardous and is governed by very strict regulations. This mode of transportation does not present any particular difficulties when the transportation equipment and infrastructures are in good condition. When such is not the case, it may become problematic: if the tank truck is not sufficiently thermally insulated, the viscosity of the bitumen may increase during an excessively long journey. Bitumen delivery distances are thus limited. Secondly, maintaining bitumen at high temperatures in tanks or in tank trucks consumes energy. In addition, maintaining bitumen at high temperatures for a long period may affect the properties of the bitumen and thus change the final performance qualities of the bituminous mix.

To overcome the problems of transporting and storing hot bitumen, conditionings enabling the transportation and storage of bitumens at ambient temperature have been developed. This mode of transporting bitumen in conditioning at ambient temperature represents only a tiny fraction of the amounts transported worldwide, but it meets very real needs for geographical regions that are difficult and expensive to access via conventional transportation means.

An example that may be mentioned of conditioning for cold transportation that is currently used is the conditioning of bitumen at ambient temperature in metal drums. This means is increasingly coming under question from an environmental viewpoint since the bitumen stored in drums must be heated before its use as road binder. However, this operation is difficult to perform for this type of conditioning, and the drums constitute waste after use. Moreover, the storage of bitumen at ambient temperature in drums leads to losses since bitumen is very viscous and part of the product remains on the walls of the drum during transfer into the tanks of the bituminous-mix production units. As regards the manipulation and transportation of bituminous products in these drums, they may prove to be difficult and hazardous if the specialized equipment for handling drums is not available to transporters or at the site of use of the bitumen.

Other examples of conditioning that may be mentioned include bitumens in the form of pellets transported and/or stored in bags, which are often used in places where the ambient temperature is high. These pellets have the advantage of being readily manipulable. U.S. Pat. No. 3,026,568 describes bitumen pellets covered with a powdery material, such as limestone powder. However, this type of granular bitumen does not prevent the bitumen from undergoing creep, especially at high ambient temperature.

WO 2009/153324 describes bitumen pellets composed of a bitumen core covered with a bitumen layer having a penetration at 25° C. of less than 5 dmm. Nevertheless, pellets of this type do not prevent creep of the bitumen constituting the core of the pellets during the storage and/or transportation of the bitumen at high ambient temperature since the shell made of bitumen having a penetration at 25° C. of less than 5 dmm does not sufficiently withstand the numerous shocks during the storage and/or transportation of the bitumen.

US 2011/0290695 describes a system for transporting bitumen in the form of slabs, said slabs being covered with a bituminous film comprising natural bitumen and synthetic polymer gum.

However, it does not describe a bitumen that is solid at ambient temperature in the form of pellets.

The Applicant has thus sought to develop bitumens that are capable of being subjected to transportation and/or storage and/or manipulation conditions at high ambient temperatures without undergoing creep, in particular bitumens in the form of pellets whose adhesion and agglomeration during their transportation and/or storage and/or manipulation at high ambient temperature are reduced relative to the pellets of the prior art.

There is thus a need to provide a road bitumen that is transportable and/or storable and/or manipulable at ambient temperature, for overcoming the drawbacks of the prior art.

FR 3 024 454 describes bitumen pellets comprising at least one chemical additive which addresses the problem of the transportation and/or storage and/or manipulation of road bitumen at ambient temperatures. However, the bitumen used in FR 3 024 454 is a mono-grade bitumen, i.e. a bitumen of a single predetermined type of grade and, consequently, the user cannot modify its properties for the purpose of optimizing them as a function of its final use.

One object of the present invention is to provide a road bitumen that is transportable and/or storable and/or manipulable at high ambient temperature, and whose properties are conserved over time.

In particular, the aim of the present invention is to provide a road bitumen that is transportable and/or storable for a period of more than two months, preferably three months, and at high ambient temperature, especially at a temperature ranging up to 100° C., preferably from 20° C. to 80° C.

Another object of the invention is to propose a road bitumen that is readily manipulable, especially at high ambient temperature, in particular at a temperature ranging up to 100° C., preferably from 20° C. to 80° C.

In particular, the aim of the present invention is to provide a road bitumen that is readily manipulable after a prolonged period of transportation and/or storage at high ambient temperature, especially for a transportation and/or storage period of more than two months, preferably more than three months, and at a temperature ranging up to 100° C., preferably between 20° C. and 80° C.

One object of the present invention is to provide a road bitumen in a form which allows its flow in solid form at ambient temperature, so as to be able to manipulate it without loss of material. It has been sought to provide a road bitumen which is in a form enabling it to be conditioned in a packaging, to remove it from the conditioning and to transfer it into equipment, even at a high ambient temperature, without the need to heat it, and without loss of material. The bitumen proposed is in divided and solid form at ambient temperature, and as such it satisfactorily solves the problems mentioned above.

Another object of the present invention is to provide a road bitumen that is transportable and/or storable and/or manipulable at high ambient temperature, and whose properties are conserved over time and whose composition may be modified beforehand as a function of its final use.

Another object is to propose an economical industrial process for manufacturing road bitumen that is transportable and/or storable and/or manipulable at ambient temperature.

Another object of the invention is to propose an economical industrial process for manufacturing bituminous mixes from road bitumen that is transportable and/or storable and/or manipulable at ambient temperature.

Another object of the invention is to propose an economical and ecological process for transporting and/or storing and/or manipulating road bitumen at ambient temperature, making it possible to avoid the use of additional means for maintaining said bitumen at elevated temperature during transportation and/or storage and/or manipulation and making it possible to minimize the presence of waste and/or residues.

SUMMARY OF THE INVENTION

The invention relates to a bitumen that is solid at ambient temperature in the form of pellets comprising a core made of a first bituminous material and a coating layer made of a second bituminous material, in which:
  the first bituminous material comprises at least one bitumen base, and
  the second bituminous material comprises:
    at least one bitumen base and at least one chemical additive chosen from: an organic compound, a viscosity-enhancing compound, a paraffin, a polyphosphoric acid, and mixtures thereof; or
    at least one pitch with a ring and ball softening point (RBSP) of greater than or equal to 80° C., it being understood that the RBSP is measured according to the standard EN 1427; or
    a mixture of these materials.

The invention also relates to a process for manufacturing a bitumen that is solid at ambient temperature in the form of pellets comprising a core made of a first bituminous material and a layer coating the core made of a second bituminous material, this process comprising:
  i) the forming of the core from the first bituminous material,
  i) the forming of the coating layer made of the second bituminous material on all or part of the surface of the core.

According to a preferred embodiment, the second bituminous material comprises:
  at least one bitumen base, or at least one pitch with a ring and ball softening point (RBSP) of greater than or equal to 80° C., it being understood that the RBSP is measured according to the standard EN 1427, or a mixture of these materials and
  at least one chemical additive chosen from: an organic compound, a viscosity-enhancing compound, a paraffin, a polyphosphoric acid, and mixtures thereof.

According to a preferred embodiment, the first bituminous material comprises at least one chemical additive chosen from: an organic compound, a viscosity-enhancing compound, a paraffin, a polyphosphoric acid, and mixtures thereof.

According to a more preferred embodiment, the chemical additive present in the first bituminous material and the additive present in the second bituminous material are identical.

According to a preferred embodiment, the chemical additive is an organic compound which has a molar mass of less than or equal to 2000 gmol$^{-1}$, preferably a molar mass of less than or equal to 1000 gmol$^{-1}$.

According to a preferred embodiment, the chemical additive is a viscosity-enhancing compound which has a dynamic viscosity of greater than or equal to 50 mPa·s$^{-1}$, preferably from 50 mPa·s$^{-1}$ to 550 mPa·s$^{-1}$, more preferentially from 80 mPa·s$^{-1}$ to 450 mPa·s$^{-1}$, the viscosity being a Brookfield viscosity measured at 65° C.

According to a preferred embodiment, the coating layer has a needle penetrability measured at 25° C. according to the standard EN 1426 of greater than 5$^{1}/_{10}$ mm.

According to a preferred embodiment, the core has a needle penetrability measured at 25° C. according to the standard EN 1426 of between 10 and 850$^{1}/_{10}$ mm.

The invention also relates to a bitumen that is solid at ambient temperature which may be obtained by performing the process defined above.

According to a preferred embodiment, the bitumen of the invention shows stability on transportation and storage at a temperature ranging from 20 to 80° C. for a period of more than or equal to two months, preferably more than or equal to three months.

The invention also relates to the use of the solid bitumen as defined above as a road binder.

According to a preferred embodiment, the use relates to the manufacture of bituminous mixes.

Another subject of the invention is a process for manufacturing bituminous mixes comprising at least one road binder and granulates, the road binder being chosen from the described above, and this process comprises at least the steps of:
  heating the granulates to a temperature ranging from 100° C. to 180° C., preferably from 120° C. to 160° C.,
  mixing the granulates with the road binder in a tank such as a mixer or a mixing drum,
  obtaining bituminous mixes.

According to a preferred embodiment, the process for manufacturing bituminous mixes does not include a step of heating the road binder before it is mixed with the granulates.

The invention also relates to a process for transporting and/or storing road bitumen, said road bitumen being transported and/or stored in the form of bitumen that is solid at ambient temperature as described above.

DETAILED DESCRIPTION

The objectives that the Applicant set itself have been achieved by means of the development of bitumen compositions in a divided form, having a core/envelope structure, in which the core is based on bitumen and the coating layer based on bitumen gives the overall structure improved properties relative to the bitumen pellets known in the prior art.

A first object of the invention relates to a bitumen that is solid at ambient temperature in the form of pellets comprising a core made of a first bituminous material and a coating layer made of a second bituminous material, in which:

the first material comprises at least one bitumen base, and the second bituminous material comprises:
- at least one bitumen base and at least one chemical additive chosen from: an organic compound, a viscosity-enhancing compound, a paraffin, a polyphosphoric acid, and mixtures thereof; or
- at least one pitch with a ring and ball softening point (RBSP) of greater than or equal to 80° C., it being understood that the RBSP is measured according to the standard EN 1427; or
- mixtures thereof.

The term "ambient temperature" means the temperature resulting from the climatic conditions under which the road bitumen is transported and/or stored and/or manipulated. More precisely, ambient temperature is equivalent to the temperature reached during the transportation and/or storage of the road bitumen, it being understood that the ambient temperature implies that no heat is supplied other than that resulting from the climatic conditions.

The invention relates to bitumens that can be subjected to a high ambient temperature, in particular a temperature ranging up to 100° C., preferably from 20° C. to 80° C.

The term "bitumen that is solid at ambient temperature" means a bitumen which has a solid appearance at ambient temperature irrespective of the transportation and/or storage conditions. More precisely, the term "bitumen that is solid at ambient temperature" means a bitumen which conserves its solid appearance throughout the transportation and/or storage and/or manipulation at ambient temperature, i.e. a bitumen which does not undergo creep at ambient temperature under its own weight and, moreover, which does not undergo creep when it is subjected to pressure forces arising from the transportation and/or storage and/or manipulation conditions.

The term "bitumen core" means a core which is formed from at least one bituminous material referred to as "first bituminous material". Preferably, the first bituminous material comprises:
- one or more bitumen bases, and
- optionally one or more chemical additives chosen from: an organic compound, a viscosity-enhancing compound, a paraffin, a polyphosphoric acid, and mixtures thereof.

The term "coating layer" means a homogeneous layer covering all or part of the surface of the core. More precisely, this means that the coating layer covers at least 90% of the surface of the core, preferably at least 95% of the surface of the core, more preferentially at least 99% of the surface of the core.

The term "coating layer made of bituminous material" means a coating layer which is formed from at least one bituminous material referred to as "second bituminous material". Preferably, the second bituminous material comprises:
- at least one bitumen base and at least one chemical additive chosen from: an organic compound, a viscosity-enhancing compound, a paraffin, a polyphosphoric acid, and mixtures thereof; or
- at least one pitch with a ring and ball softening point (RBSP) of greater than or equal to 80° C., it being understood that the RBSP is measured according to the standard EN 1427; or
- a mixture of at least two of these materials.

The term "consists essentially of" followed by one or more features means that, besides the components or steps specifically listed, components or steps which do not significantly modify the properties and features of the invention may be included in the process or the material of the invention.

The Bitumen Base

For the purposes of the invention, the terms "bitumen" and "road bitumen" are used equivalently and independently of each other. The term "bitumen" or "road bitumen" means any bituminous composition constituted by one or more bitumen bases, said compositions being intended for a road application.

Among the bitumen bases that may be used according to the invention, mention may be made first of bitumens of natural origin, those contained in deposits of natural bitumen, of natural asphalt or bituminous sands and bitumens originating from the refining of crude oil. The bitumen bases according to the invention are advantageously chosen from bitumen bases originating from the refining of crude oil. The bitumen bases may be chosen from bitumen bases or mixtures of bitumen bases originating from the refining of crude oil, in particular bitumen bases containing asphaltenes or pitches.

The bitumen bases may be obtained via conventional processes for manufacturing bitumen bases at a refinery, in particular by direct distillation and/or vacuum distillation of oil. These bitumen bases may optionally be viscosity-reduced and/or de-asphalted and/or air-rectified. It is common practice to perform vacuum distillation on the atmospheric residues originating from the atmospheric distillation of crude oil. This manufacturing process consequently corresponds to the succession of atmospheric distillation and vacuum distillation, the charge feeding the vacuum distillation corresponding to the atmospheric residues. These vacuum residues derived from the vacuum distillation tower may also be used as bitumens. It is also common practice to inject air into a charge usually composed of distillates and of heavy products originating from the vacuum distillation of atmospheric residues originating from oil distillation. This process makes it possible to obtain a blown or semi-blown or air-oxidized or air-rectified or partially air-rectified base.

The various bitumen bases obtained via the refining processes may be combined together to obtain the best technical compromise. The bitumen base may also be a recycling bitumen base.

According to the invention, blown bitumens may be manufactured in a blowing unit, by passing a stream of air and/or oxygen through a starting bitumen base.

This operation may be performed in the presence of an oxidation catalyst, for example phosphoric acid. The blowing is generally performed at high temperatures, of the order of 200 to 300° C., for relatively long times typically between 30 minutes and 2 hours, continuously or in batches. The blowing time and temperature are adjusted as a function of the properties targeted for the blown bitumen and as a function of the quality of the starting bitumen.

The Chemical Additive

According to the invention, the chemical additive is chosen from: an organic compound, a viscosity-enhancing compound, a paraffin, a polyphosphoric acid, and mixtures thereof.

According to a first embodiment of the invention, the chemical additive is an organic compound. Advantageously, the organic compound has a molar mass of less than or equal to 2000 gmol$^{-1}$, preferably a molar mass of less than or equal to 1000 gmol$^{-1}$.

In this first embodiment, according to a first variant, the organic compound is a compound of general formula (I):

$$Ar1-R-Ar2 \qquad (I),$$

in which:
Ar1 and Ar2 represent, independently of each other, a benzene nucleus or a system of fused aromatic nuclei of 6 to 20 carbon atoms, substituted with at least one hydroxyl group, and
R represents an optionally substituted divalent radical, the main chain of which comprises from 6 to 20 carbon atoms and at least one group chosen from amide, ester, hydrazide, urea, carbamate and anhydride functions.

Preferably, Ar1 and/or Ar2 are substituted with at least one alkyl group of 1 to 10 carbon atoms, advantageously in one or more ortho positions relative to the hydroxyl group(s); more preferentially, Ar1 and Ar2 are 3,5-dialkyl-4-hydroxyphenyl groups, advantageously 3,5-di-tert-butyl-4-hydroxyphenyl groups.

Preferably, R is in the para position relative to a hydroxyl group of Ar1 and/or Ar2.

Advantageously, the compound of formula (I) is 2',3-bis[(3-[3,5-di-tert-butyl-4-hydroxyphenyl]propionyl)]propionohydrazide.

According to a second variant of this first embodiment, the organic compound is a compound of general formula (II):

$$R-(NH)_nCONH-(X)_m-NHCO(NH)_n-R' \qquad (II),$$

in which:
the groups R and R', which may be identical or different, contain a saturated or unsaturated, linear, branched or cyclic hydrocarbon-based chain, comprising from 1 to 22 carbon atoms, which is optionally substituted, and optionally comprising heteroatoms, rings and/or heterocycles;
the group X contains a saturated or unsaturated, linear, branched or cyclic hydrocarbon-based chain, comprising from 1 to 22 carbon atoms, which is optionally substituted, and optionally comprising heteroatoms, rings and/or heterocycles;
n and m are integers having a value of 0 or 1, independently of each other.

According to this variant, when the integer m has a value of 0, then the groups R—(NH)$_n$CONH and NHCO(NH)$_n$—R' are covalently bonded via a hydrazide bond CONH—NHCO. The group R, or the group R', then comprises at least one group chosen from: a hydrocarbon-based chain of at least 4 carbon atoms, an aliphatic ring of 3 to 8 atoms, an aliphatic, partially aromatic or totally aromatic fused polycyclic system, each ring comprising 5 or 6 atoms.

Still according to this variant, when the integer m has a value of 1, then the group R, the group R' and/or the group X comprises at least one group chosen from: a hydrocarbon-based chain of at least 4 carbon atoms, an aliphatic ring of 3 to 8 atoms, an aliphatic, partially aromatic or totally aromatic fused polycyclic system, each ring comprising 5 or 6 atoms.

Preferably, the group R and/or R' comprises an aliphatic hydrocarbon-based chain of 4 to 22 carbon atoms, chosen especially from $C_4H_9$, $C_5H_{11}$, $C_9H_{19}$, $C_{11}H_{23}$, $C_{12}H_{25}$, $C_{17}H_{35}$, $C_{18}H_{37}$, $C_{21}H_{43}$ and $C_{22}H_{45}$ groups.

Preferably, the group X represents a linear saturated hydrocarbon-based chain comprising from 1 to 22 carbon atoms. Preferably, the group X is chosen from $C_2H_4$ and $C_3H_6$ groups.

Preferably, the group X may also be a cyclohexyl group or a phenyl group, and the radicals R—(NH)$_n$CONH— and NHCO(NH)$_n$—R'— may then be in the ortho, meta or para position. Moreover, the radicals R—(NH)$_n$CONH— and NHCO(NH)$_n$—R'— may be in the cis or trans position relative to each other. Furthermore, when the radical X is cyclic, this ring may be substituted with groups other than the two main groups R—(NH)$_n$CONH— and —NHCO(NH)$_n$—R'.

Preferably, the group X comprises two rings of 6 carbons bonded via a CH$_2$ group, these rings being aliphatic or aromatic. In this case, the group X is a group including two aliphatic rings bonded via an optionally substituted CH$_2$ group, for instance:

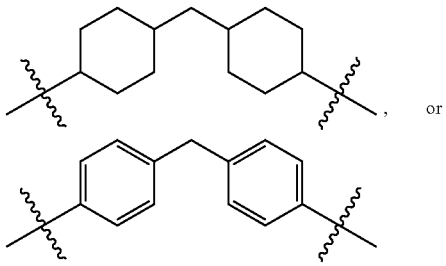

, or

Advantageously, according to this variant, the organic compound is a compound of general formula (II) chosen from hydrazide derivatives such as the compounds $C_5H_{11}$—CONH—NHCO—$C_5H_{11}$, $C_9H_{19}$—CONH—NHCO—$C_9H_{19}$, $C_{11}H_{23}$—CONH—NHCO—$C_{11}H_{23}$, $C_{17}H_{35}$—CONH—NHCO—$C_{17}H_{35}$, or $C_{21}H_{43}$—CONH—NHCO—$C_{21}H_{43}$; diamides such as N,N'-ethylenedi(stearamide) of formula $C_{17}H_{35}$—CONH—CH$_2$—CH$_2$—NHCO—$C_{17}H_{35}$; and ureide derivatives such as 4,4'-bis(dodecylaminocarbonylamino)diphenylmethane of formula $C_{12}H_{25}$—NHCONH—$C_6H_4$—CH$_2$—$C_6H_4$—NHCONH—$C_{12}H_{25}$.

According to a third variant of this embodiment, the organic compound is a compound of formula (III):

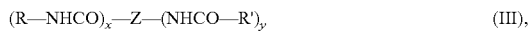
$$(R-NHCO)_x-Z-(NHCO-R')_y \qquad (III),$$

in which:
R and R', which may be identical or different, contain a saturated or unsaturated, linear, branched or cyclic hydrocarbon-based chain, comprising from 1 to 22 carbon atoms, which is optionally substituted, and optionally comprising heteroatoms, rings and/or heterocycles,
Z represents a trifunctionalized group chosen from the following groups:

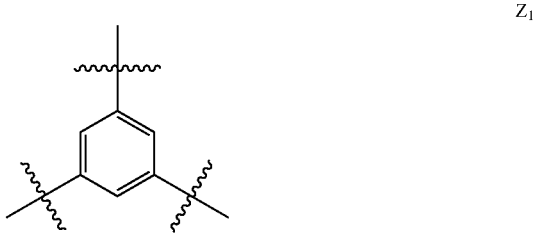

$Z_1$

-continued $Z_2$

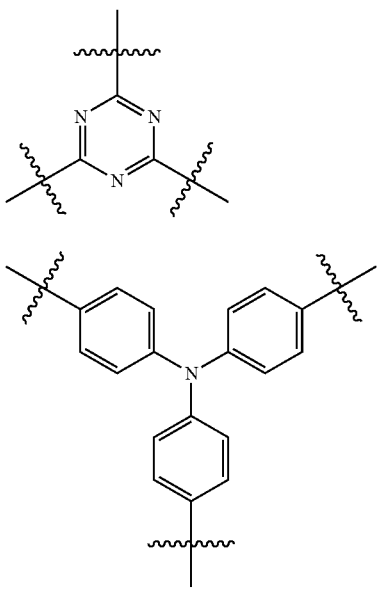

x and y are different integers with a value ranging from 0 to 3, and such that x+y=3.

Preferably, when x is equal to 0 and Z represents $Z_2$, the compound of formula (III) is N2,N4,N6-tridecylmelamine having the following formula with R' representing the $C_9H_{19}$ group:

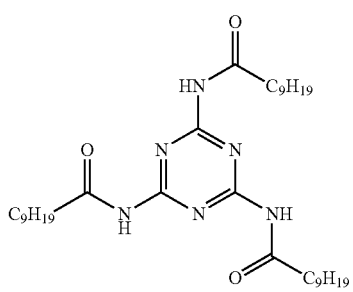

Other preferred compounds corresponding to formula (III) are such that x is equal to 0, Z represents $Z_2$ and R' represents a saturated linear hydrocarbon-based chain of 1 to 22 carbon atoms, preferably of 2 to 18 carbon atoms, preferably of 5 to 12 carbon atoms.

Other preferred compounds corresponding to formula (III) are such that: y is equal to 0 and Z represents $Z_1$, the compounds then having the formula:

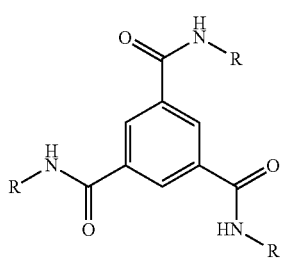

with R chosen from the following groups, taken alone or as mixtures:

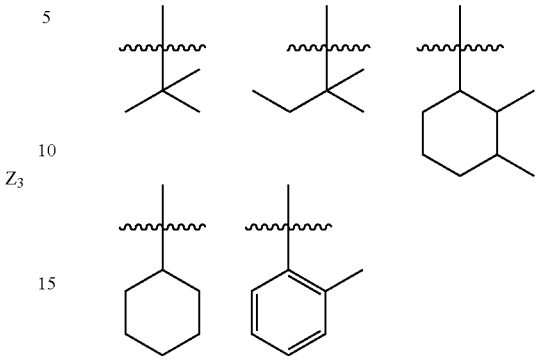

Other preferred compounds corresponding to formula (III) are such that: y is equal to 0, Z represents $Z_1$ and R represents a saturated linear hydrocarbon-based chain of 1 to 22 carbon atoms, preferably of 8 to 12 carbon atoms.

According to a fourth variant of this embodiment, the organic compound is a product of the reaction of at least one C3-C12 polyol and of at least one C2-C12 aldehyde. Among the polyols that may be used, mention may be made of sorbitol, xylitol, mannitol and/or ribitol. Preferably, the polyol is sorbitol.

Advantageously, according to this variant, the organic compound is a compound which comprises at least one function of general formula (IV):

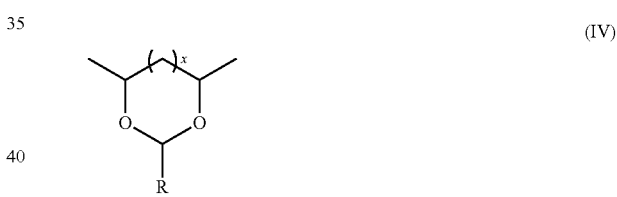

(IV)

with:
x is an integer, x may be equal to 0,
R is chosen from a C1-C11 alkyl, alkenyl, aryl or aralkyl radical, optionally substituted with one or more halogen atoms, one or more C1-C6 alkoxy groups.

The organic compound is advantageously a sorbitol derivative. The term "sorbitol derivative" means any reaction product obtained from sorbitol, in particular any reaction product obtained by reacting an aldehyde with D-sorbitol. Sorbitol acetals, which are sorbitol derivatives, are obtained via this condensation reaction. 1,3:2,4-Di-O-benzylidene-D-sorbitol is obtained by reacting 1 mol of D-sorbitol and 2 mol of benzaldehyde and has the formula:

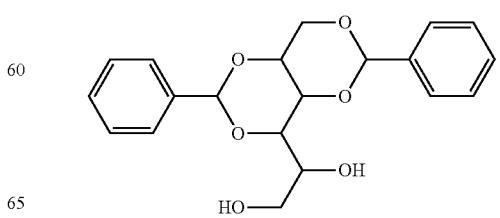

The sorbitol derivatives may thus all be condensation products of aldehydes, especially of aromatic aldehydes, with sorbitol. Sorbitol derivatives will then be obtained having the general formula:

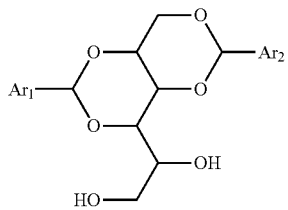

in which $Ar_1$ and $Ar_2$ are optionally substituted aromatic nuclei.

Among the sorbitol derivatives, other than 1,3:2,4-di-O-benzylidene-D-sorbitol, there may be, for example, 1,3:2,4:5,6-tri-O-benzylidene-D-sorbitol, 2,4-mono-O-benzylidene-D-sorbitol, 1,3:2,4-bis(p-methylbenzylidene)sorbitol, 1,3:2,4-bis(3,4-dimethylbenzylidene)sorbitol, 1,3:2,4-bis(p-ethylbenzylidene)sorbitol, 1,3:2,4-bis(p-propylbenzylidene)sorbitol, 1,3:2,4-bis(p-butylbenzylidene)sorbitol, 1,3:2,4-bis(p-ethoxylbenzylidene)sorbitol, 1,3:2,4-bis(p-chlorobenzylidene)sorbitol, 1,3:2,4-bis(p-bromobenzylidene)sorbitol, 1,3:2,4-di-O-methylbenzylidene-D-sorbitol, 1,3:2,4-di-O-dimethylbenzylidene-D-sorbitol, 1,3:2,4-di-O-(4-methylbenzylidene)-D-sorbitol and 1,3:2,4-di-O-(4,3-dimethylbenzylidene)-D-sorbitol. Preferably, according to this variant, the organic compound is 1,3:2,4-di-O-benzylidene-D-sorbitol.

According to a fifth variant of this embodiment, the organic compound is a compound of general formula (V):

R"—(COOH)$_z$          (V), in which R" represents a linear or branched, saturated or unsaturated chain comprising from 4 to 68 carbon atoms, preferably from 4 to 54 carbon atoms, more preferentially from 4 to 36 carbon atoms and z is an integer ranging from 2 to 4.

Preferably, the group R" is preferably a saturated linear chain of formula $C_wH_{2w}$ with w being an integer ranging from 4 to 22, preferably from 4 to 12.

According to this variant of the invention, the organic compounds corresponding to formula (V) may be diacids (z=2), triacids (z=3) or tetracids (z=4). The preferred organic compounds according to this variant are diacids with z=2.

Preferably, according to this variant, the diacids have the general formula HOOC—$C_wH_{2w}$—COOH with w being an integer ranging from 4 to 22, preferably from 4 to 12 and in which z=2 and R"=$C_wH_{2w}$.

Advantageously, according to this variant, the organic compound is a diacid chosen from adipic acid or 1,6-hexanedioic acid with w=4, pimelic acid or 1,7-heptanedioic acid with w=5, suberic acid or 1,8-octanedioic acid with w=6, azelaic acid or 1,9-nonanedioic acid with w=7, sebacic acid or 1,10-decanedioic acid with w=8, undecanedioic acid with w=9, 1,2-dodecadioic acid with w=10 or tetradecanedioic acid with w=12.

The diacids may also be diacid dimers of unsaturated fatty acid(s), i.e. dimers formed from at least one unsaturated fatty acid, for example from a single unsaturated fatty acid or from two different unsaturated fatty acids. The diacid dimers of unsaturated fatty acid(s) are conventionally obtained by intermolecular dimerization reaction of at least one unsaturated fatty acid (for example Diels-Alder reaction). Prefer-ably, only one type of unsaturated fatty acid is dimerized. They are derived in particular from the dimerization of an unsaturated fatty acid especially of $C_8$ to $C_{34}$, especially of $C_{12}$ to $C_{22}$, in particular of $C_{16}$ to $C_{20}$ and more particularly of $C_{18}$. A preferred fatty acid dimer is obtained by dimerization of linoleic acid, which may then be partially or totally hydrogenated. Another preferred fatty acid dimer has the formula HOOC—$(CH_2)_7$—CH=CH—$(CH_2)_7$—COOH. Another preferred fatty acid dimer is obtained by dimerization of methyl linoleate. Similarly, fatty acid triacids and fatty acid tetracids may be found, which are obtained, respectively, by trimerization and tetramerization of at least one fatty acid.

According to a sixth variant of this embodiment, the organic compound is a compound of general formula (VI):

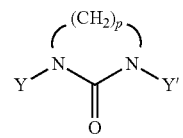

in which:
the groups Y and Y' represent, independently of each other, an atom or group chosen from: H, —$(CH_2)q$-$CH_3$, —$(CH_2)q$-$NH_2$, —$(CH_2)q$-OH, —$(CH_2)q$-COOH or

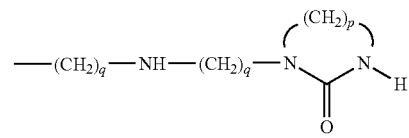

with q being an integer ranging from 2 to 18, preferably from 2 to 10, preferably from 2 to 4 and p being an integer greater than or equal to 2, preferably having a value of 2 or 3.

Among the preferred organic compounds corresponding to formula (VI), mention may be made of the following compounds:

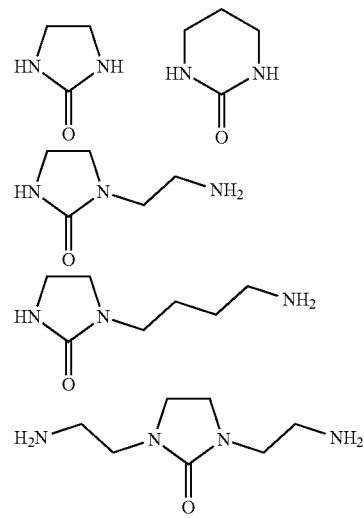

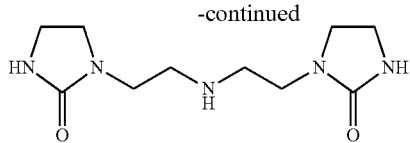

Preferably, according to this variant, the organic compound of general formula (VI) is:

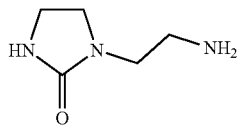

According to a seventh variant of this embodiment, the organic compound is a compound of general formula (VII):

R—NH—CO—CO—NH—R' (VII)

in which R and R', which may be identical or different, represent a saturated or unsaturated, linear, branched or cyclic hydrocarbon-based chain, comprising from 1 to 22 carbon atoms, preferably from 8 to 12 carbon atoms, which is optionally substituted, and optionally comprising heteroatoms, rings and/or heterocycles.

When the chemical additive is chosen from the organic compounds, it is preferentially chosen from the compounds of formula (I) and the compounds of formula (V).

Among the organic compounds of formula (I), the chemical additive is preferentially 2',3-bis[(3-[3,5-di-tert-butyl-4-hydroxyphenyl]propionyl)]propionohydrazide.

Among the organic compounds of formula (V), the chemical additive is preferentially sebacic acid or 1,10-decanedioic acid.

According to another embodiment of the invention, the chemical additive is a paraffin. Paraffins have chain lengths from 30 to 120 carbon atoms ($C_{30}$ to $C_{120}$). The paraffins are advantageously chosen from polyalkylenes. Preferably, use will be made according to the invention of polymethylene paraffins and polyethylene paraffins. These paraffins may be of petroleum origin or may originate from the chemical industry. Advantageously, the paraffins used are synthetic paraffins derived the conversion of biomass and/or natural gas.

Preferably, these paraffins contain a large proportion of "normal" paraffins, i.e. linear, straight-chain, unbranched paraffins (saturated hydrocarbons). Thus, the paraffins may comprise from 50% to 100% of normal paraffins and from 0 to 50% of isoparaffins and/or branched paraffins. More preferentially, the paraffins comprise from 85% to 95% of normal paraffins and from 5% to 15% of isoparaffins and/or of branched paraffins. Advantageously, the paraffins comprise from 50% to 100% of normal paraffins and from 0 to 50% of isoparaffins. Even more advantageously, the paraffins comprise from 85% to 95% of normal paraffins and from 5% to 15% of isoparaffins.

Preferably, the paraffins are polymethylene paraffins. More particularly, the paraffins are synthetic polymethylene paraffins, for example paraffins derived from the conversion of synthesis gas via the Fischer-Tropsch process. In the Fischer-Tropsch process, paraffins are obtained by reaction of hydrogen with carbon oxide on a metal catalyst. Fischer-Tropsch synthetic processes are described, for example, in the publications EP 1 432 778, EP 1 328 607 or EP 0 199 475.

According to another embodiment of the invention, the chemical additive is a polyphosphoric acid. Polyphosphoric acids (PPA) that may be used in the invention are described in WO 97/14753.

Polyphosphoric acids are compounds of empirical formula PqHrOs in which q, r and s are positive numbers such that $q \geq 2$ and especially ranging from 3 to 20 or more and such that $5q+r-2s=0$.

In particular, said polyphosphoric acids may be linear compounds of empirical formula $P_qH_{(q+2)}O_{(3q+1)}$ corresponding to the structural formula:

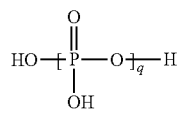

in which q has the definition given above. They may also be products of two-dimensional or three-dimensional structure.

All these polyphosphoric acids may be considered as products of polycondensation by heating aqueous metaphosphoric acid.

According to a particular embodiment of the invention, the chemical additive is a viscosity-enhancing compound. The viscosity-enhancing compound is a compound which has the property of reducing the fluidity of a liquid or of a composition and thus of increasing its viscosity.

For the purposes of the invention, the terms "viscosity enhancer" and "viscosity-enhancing compound" are used equivalently and independently of each other.

In this embodiment, the viscosity-enhancing compound is a material which has a dynamic viscosity of greater than or equal to 50 mPa·s$^{-1}$, preferably from 50 mPa·s$^{-1}$ to 550 mPa·s$^{-1}$, more preferentially from 80 mPa·s$^{-1}$ to 450 mPa·s$^{-1}$, the viscosity being a Brookfield viscosity measured at 65° C. The viscosity of a viscosity enhancer according to the invention is measured at 65° C. using a Brookfield CAP 2000+ viscometer and at a spin speed of 750 rpm. The measurement reading is taken after 30 seconds for each temperature.

The viscosity-enhancing compound is preferably chosen from:
  gelling compounds preferably of plant or animal origin, such as: gelatin, agar-agar, alginates, cellulose derivatives, starches, modified starches, or gellan gums;
  polyethylene glycols (PEG) such as PEGs with a molecular weight of between 800 g·mol$^{-1}$ and 8000 g·mol$^{-1}$, for instance a PEG with a molecular weight of 800 g·mol$^{-1}$ (PEG-800), a PEG with a molecular weight of 1000 g·mol$^{-1}$ (PEG-1000), a PEG with a molecular weight of 1500 g·mol$^{-1}$ (PEG-1500), a PEG with a molecular weight of 4000 g·mol$^{-1}$ (PEG-4000) or a PEG with a molecular weight of 6000 g·mol$^{-1}$ (PEG-6000);
  mixtures of such compounds.

It would not constitute a departure from the scope of the invention to combine several different chemical additives such as different organic compounds of formulae (I), (II), (III), (V), (VI) and (VII), reaction products of at least one C3-C12 polyol and of at least one C2-C12 aldehyde, especially those comprising a group of formula (IV), and/or various paraffins and/or various polyphosphoric acids and/or various viscosity-enhancing compounds in the bitumen base.

According to a first preferred embodiment of the invention, the chemical additive is chosen from an organic compound, a viscosity-enhancing compound, a paraffin, and mixtures thereof.

According to a second preferred embodiment of the invention, the chemical additive is chosen from an organic compound, a viscosity-enhancing compound, a polyphosphoric acid, and mixtures thereof.

Even more preferentially, the chemical additive is chosen from an organic compound, a viscosity-enhancing compound, and mixtures thereof.

Advantageously, the chemical additive is chosen from viscosity-enhancing compounds.

According to one embodiment of the invention, the bitumen base comprises from 0.1% to 20% by mass, preferably from 0.5% to 15% by mass, more preferentially from 0.5% to 10% by mass of chemical additive relative to the total mass of said bitumen base.

The additives described below make it possible to form the bitumen in an individual solid form.

Preferably, the bitumen base comprising the additive has a ring and ball softening point (RBSP) of between 80° C. and 130° C., more preferentially between 90° C. and 130° C., it being understood that the RBSP is measured according to the standard EN 1427.

The Bitumen Core

According to a first embodiment of the invention, the nucleus or core of the solid bitumen pellets according to the invention is prepared from at least one first bituminous material, said first bituminous material being prepared by placing in contact:
one or more bitumen bases, and
optionally one or more chemical additives chosen from:
an organic compound, a viscosity-enhancing compound, a paraffin, a polyphosphoric acid, and mixtures thereof.

The chemical additive is as defined above.

According to another embodiment of the invention, the nucleus or core of the solid bitumen pellets according to the invention is prepared from at least one first bituminous material, said first bituminous material being prepared by placing in contact:
one or more bitumen bases, and
at least one chemical additive chosen from: an organic compound, a viscosity-enhancing compound, a paraffin, a polyphosphoric acid, and mixtures thereof.

These compositions comprising at least one bitumen base and optionally one or more chemical additives constitute the first bituminous material.

The first bituminous material, used for manufacturing the core of the pellets of the invention, has a needle penetrability measured at 25° C. according to the standard EN 1426 of from 10 to 850 1/10 mm, preferably from 20 to 600 1/10 mm, more preferentially from 20 to 330 1/10 mm.

In a known manner, the measurement known as the "needle penetrability" is performed by means of a standardized test NF EN 1426 at 25° C. ($P_{25}$). This penetrability feature is expressed in tenths of a millimeter (dmm or 1/10 mm). The needle penetrability, measured at 25° C. according to the standardized test NF EN 1426, represents the measurement of the penetration into a bitumen sample, after a time of 5 seconds, of a needle whose weight with its support is 100 g.

The first bituminous material, used for manufacturing the core of the pellets of the invention, advantageously has a dynamic viscosity of between 50 and 200 mPa·s, preferably between 70 and 150 mPa·s, the viscosity being a Brookfield viscosity measured at 135° C.

The viscosity of a bitumen base is measured at 135° C. by means of a Brookfield CAP 2000+ viscometer and at a spin speed of 750 rpm. The measurement reading is taken after 30 seconds for each temperature.

According to one embodiment of the invention, the bitumen base forming the core of the pellets according to the invention may also comprise at least one known bitumen elastomer such as SB copolymers (copolymer containing styrene and butadiene blocks), SBS copolymers (copolymer containing styrene-butadiene-styrene blocks), SIS (styrene-isoprene-styrene) copolymers, SBS* copolymers (copolymer containing styrene-butadiene-styrene star blocks), SBR (styrene-b-butadiene-rubber) copolymers and EPDM (ethylene propylene diene modified) copolymers. These elastomers may also be crosslinked according to any known process, for example with sulfur. Mention may also be made of elastomers prepared from styrene monomers and butadiene monomers allowing crosslinking without a crosslinking agent, as described in WO 2007/058994 and WO 2008/137394 and by the Applicant in patent application WO 11/013073.

According to this embodiment, the first bituminous material advantageously comprises from 1% to 10% by mass, preferably from 2% to 8% by mass and more preferentially from 3% to 6% by mass of elastomer relative to the total mass of said first bituminous material.

According to one embodiment of the invention, the first bituminous material may also comprise at least one olefinic polymer adjuvant.

The olefinic polymer adjuvant is preferably chosen from the group consisting of (a) ethylene/glycidyl (meth)acrylate copolymers; (b) ethylene/monomer A/monomer B terpolymers and (c) copolymers resulting from the grafting of a monomer B onto a polymer substrate.

(a) The ethylene/glycidyl (meth)acrylate copolymers are advantageously chosen from statistical or block, preferably statistical, copolymers of ethylene and of a monomer chosen from glycidyl acrylate and glycidyl methacrylate, comprising from 50% to 99.7% by mass, preferably from 60% to 95% by mass and more preferentially 60% to 90% by mass of ethylene.

(b) The terpolymers are advantageously chosen from statistical or block, preferably statistical, terpolymers of ethylene, of a monomer A and of a monomer B.

Monomer A is chosen from vinyl acetate and $C_1$ to $C_6$ alkyl acrylates or methacrylates.

Monomer B is chosen from glycidyl acrylate and glycidyl methacrylate.

The ethylene/monomer A/monomer B terpolymers comprise from 0.5% to 40% by mass, preferably from 5% to 35% by mass and more preferentially from 10% to 30% by mass of units derived from monomer A, and from 0.5% to 15% by mass and preferably from 2.5% to 15% by mass of units derived from monomer B, the remainder being formed from units derived from ethylene.

(c) The copolymers result from the grafting of a monomer B chosen from glycidyl acrylate and glycidyl methacrylate onto a polymer substrate. The polymer substrate consists of a polymer chosen from polyethylenes, especially low-density polyethylenes, polypropylenes, statistical or block, preferably statistical, copolymers of ethylene and of vinyl acetate, and statistical or block, preferably statistical, copolymers of ethylene and of $C_1$ to $C_6$ alkyl acrylate or methacrylate, comprising from 40% to 99.7% by mass and preferably from 50% to 99% by mass of ethylene. Said grafted copolymers comprise from 0.5% to 15% by mass and preferably from 2.5% to 15% by mass of grafted units derived from monomer B.

Advantageously, the olefinic polymer adjuvant is chosen from statistical terpolymers of ethylene (b), of a monomer A chosen from $C_1$ to $C_6$ alkyl acrylates or methacrylates and of a monomer B chosen from glycidyl acrylate and glycidyl methacrylate, comprising from 0.5% to 40% by mass, preferably from 5% to 35% by mass and more preferentially from 10% to 30% by mass of units derived from monomer A, and from 0.5% to 15% by mass and preferably from 2.5% to 15% by mass of units derived from monomer B, the remainder being formed from units derived from ethylene.

According to this embodiment of the invention, advantageously, the first bituminous material advantageously of which the core of the pellets is composed comprises from 0.05% to 15% by mass, preferably from 0.1% to 10% by mass and more preferentially from 0.5% to 6% by mass of olefinic polymer adjuvant relative to the total mass of said first bituminous material.

According to a particular embodiment, the core may also comprise at least one anti-agglomerating agent preferably of mineral or organic origin.

Preferably, the anti-agglomerating agent is chosen from talc; fines generally with a diameter of less than 125 µm with the exception of limestone fines, such as siliceous fines; sand such as Fontainebleau sand; cement; carbon; wood residues such as lignin, lignosulfonate, conifer needle powders, conifer cone powders, especially of pine; glass powder; clays such as kaolin, bentonite or vermiculite; alumina such as alumina hydrates; silica; silica derivatives such as silicates, silicon hydroxides and silicon oxides; plastic powder; calcium oxide; plaster; rubber powder; powder of polymers such as styrene-butadiene (SB) copolymers or styrene-butadiene-styrene (SBS) copolymers; and mixtures thereof.

Advantageously, the anti-agglomerating agent is chosen from talc; fines generally with a diameter of less than 125 µm with the exception of limestone fines, such as siliceous fines; wood residues such as lignin, lignosulfonate, conifer needle powders, conifer cone powders, especially of pine; glass powder; sand such as Fontainebleau sand; and mixtures thereof.

According to one embodiment of the invention, the first bituminous material also comprises between 0.5% and 20% by mass, preferably between 2% and 20% by mass and more preferentially between 2% and 15% by mass of the anti-agglomerating agent relative to the total mass of the first bituminous material.

The Coating Layer Made of Bituminous Material

According to one embodiment of the invention, the coating layer is made of a second bituminous material comprising:
- at least one bitumen base and at least one chemical additive chosen from: an organic compound, a viscosity-enhancing compound, a paraffin, a polyphosphoric acid, and mixtures thereof; or
- at least one pitch with a ring and ball softening point (RBSP) of greater than or equal to 80° C., it being understood that the RBSP is measured according to the standard EN 1427; or
- a mixture of these materials.

The second bituminous material is solid at ambient temperature, including at high ambient temperature.

Preferably, the chemical additive is as defined above.

According to a particular embodiment of the invention, the coating layer made of bituminous material comprises at least one bitumen base, or at least one pitch with a ring and ball softening point (RBSP) of greater than or equal to 80° C., it being understood that the RBSP is measured according to the standard EN 1427, or a mixture of these materials and a chemical additive chosen from: an organic compound, a viscosity-enhancing compound, a paraffin, a polyphosphoric acid, and mixtures thereof.

Pitch:

According to the dictionary, the term "pitch" means a distillation residue of petroleum tars, of hard coal, of wood or of other organic molecules.

The pitch used in the present invention is advantageously chosen from distillation residues of petroleum tars.

"Petroleum pitch" is predominantly composed of a mixture of aromatic hydrocarbons and of aromatic hydrocarbons substituted with alkyl groups.

"Petroleum pitch" is in solid form at ambient temperature.

Pitches may be obtained via conventional refinery manufacturing processes. The manufacturing process corresponds to the succession of atmospheric distillation and vacuum distillation. In a first stage, crude oil is subjected to distillation at atmospheric pressure, which leads to the production of a gaseous phase, of various distillates and of an atmospheric distillation residue. Next, the atmospheric distillation residue is itself subjected to distillation under reduced pressure, known as vacuum distillation, which allows the separation of a heavy gas oil, various distillate fractions and a vacuum distillation residue. This vacuum distillation residue contains "petroleum pitch" in variable concentration.

It is possible to obtain "petroleum pitch" according to the following process:

The vacuum distillation residue is subjected to a de-asphalting operation by addition of a suitable solvent, such as a solvent of alkane type comprising from 3 to 6 carbon atoms, for example n-propane, which thus makes it possible to precipitate the pitch and to separate it from the de-asphalted oil.

It is also possible to obtain an oxidized "petroleum pitch" by placing it in a blowing tower in the presence of a catalyst, at a set temperature and a given pressure.

The mechanical qualities of the pitches are generally evaluated by determining a series of mechanical features via standardized tests, the most widely used of which are the needle penetrability expressed in ⅒ mm and the softening point determined by the ring and ball test, also known as the ring and ball softening point (RBSP).

Preferably, the pitch has a ring and ball softening point (RBSP) of between 80° C. and 180° C., more preferentially between 80° C. and 170° C., it being understood that the RBSP is measured according to the standard EN 1427.

For example, among the pitches according to the invention, use may be made of a pitch with a ring and ball softening point (RBSP) of between 130° C. and 160° C., it being understood that the RBSP is measured according to the standard EN 1427. For example, among the pitches according to the invention, use may be made of a pitch also having a dynamic viscosity ranging from 1500 to 2500 mPa·s, preferably from 1800 to 2200 mPa·s, more preferentially from 2000 to 2100 mPa·s, the viscosity being a Brookfield viscosity measured at 200° C.

Advantageously, the pitch used according to the invention has a ring and ball softening point (RBSP) of from 130° C. to 160° C., it being understood that the RB SP is measured according to the standard EN 1427, and a dynamic viscosity of from 1800 to 2200 mPa·s, the viscosity being a Brookfield viscosity measured at 200° C.

According to a particular embodiment of the invention, the second bituminous material has a needle penetrability measured at 25° C. according to the standard EN 1426 of greater than 5 1/10 mm, preferably ranging from 5 to 40 1/10 mm with the value 5 excluded, more preferentially ranging from 6 to 40 1/10 mm.

In addition, the coating layer made of second bituminous material may optionally comprise at least one olefinic polymer adjuvant as defined above.

According to one embodiment of the invention, the second bituminous material comprises from 0.05% to 15% by mass, preferably from 0.1% to 10% by mass and more preferentially from 0.5% to 6% by mass of olefinic polymer adjuvant relative to the total mass of the second bituminous material.

In addition, the second bituminous material may optionally comprise at least one bitumen elastomer as defined above.

According to one embodiment, the coating layer comprises from 1% to 10% by mass, preferably from 2% to 8% by mass and more preferentially from 3% to 6% by mass of elastomer relative to the total mass of the second bituminous material.

According to a particular embodiment of the invention, the second bituminous material may optionally comprise at least one anti-agglomerating agent as defined above.

According to one embodiment of the invention, the second bituminous material also comprises between 0.5% and 30% by mass, preferably between 2% and 25% by mass and more preferentially between 2% and 20% by mass of the anti-agglomerating agent relative to the total mass of the second bituminous material.

According to a particular embodiment of the invention, the bitumen that is solid at ambient temperature may also comprise a second coating layer.

The term "second coating layer" means a homogeneous coating layer covering all or part of the surface of the first coating layer surrounding the core, and directly in contact with the core, also known as the "first coating layer". More precisely, this means that the second coating layer covers at least 90% of the surface of the first coating layer, preferably at least 95% of the surface of the surface of the first coating layer, more preferentially at least 99% of the surface of the first coating layer.

In this particular embodiment, the second coating layer may cover at least part of the surface of the first coating layer, with an anti-agglomerating agent as defined above.

In this embodiment of the invention, the second coating layer may be obtained by application of a composition comprising at least one viscosity-enhancing compound as defined above and at least one anti-agglomerating compound as defined above onto all or part of the surface of the first coating layer.

Preferably, the second coating layer is solid at ambient temperature, including at high ambient temperature.

Preferably, the composition of which the second coating layer is constituted, comprising at least one viscosity-enhancing compound and at least one anti-agglomerating compound, has a viscosity of greater than or equal to 200 mPa·s$^{-1}$, preferably between 200 mPa·s$^{-1}$ and 700 mPa·s$^{-1}$, the viscosity being a Brookfield viscosity.

Preferentially, the second coating layer comprises at least 10% by mass of a viscosity-enhancing compound relative to the total mass of the second coating layer, preferably from 10% to 90% by mass, more preferentially from 10% to 85% by mass.

Advantageously, when the viscosity-enhancing agent is a gelling agent, for instance gelatin, the second coating layer comprises from 10% to 90% by mass of viscosity-enhancing compound relative to the total mass of the second coating layer, preferably from 15% to 85% and better still from 15% to 60%.

Advantageously, when the viscosifying agent is a gelling agent, for instance gelatin, the second coating layer comprises from 10% to 90% by mass of anticaking compound relative to the total mass of the second coating layer, preferably from 15% to 85% and better still from 40% to 85%.

Advantageously, when the viscosity-enhancing agent is a PEG, for instance a PEG with a molecular weight of between 800 g·mol$^{-1}$ and 8000 g·mol$^{-1}$, the second coating layer comprises from 10% to 90% by mass of viscosity-enhancing compound relative to the total mass of the second coating layer, preferably from 40% to 90% and better still from 60% to 90%.

Advantageously, when the viscosity-enhancing agent is a PEG, for instance a PEG with a molecular weight of between 800 g·mol$^{-1}$ and 8000 g·mol$^{-1}$, the second coating layer comprises from 10% to 90% by mass of anti-agglomerating compound relative to the total mass of the second coating layer, preferably from 10% to 60% and better still from 10% to 40%.

Preferentially, the second coating layer comprises at least 10% by mass of an anti-agglomerating compound relative to the total mass of the second coating layer, preferably from 10% to 90% by mass and even more preferentially from 15% to 90% by mass.

Advantageously, the viscosity-enhancing compound and the anti-agglomerating compound represent at least 90% by mass relative to the total mass of the second coating layer, better still at least 95% by mass and advantageously at least 98% by mass.

According to a preferred embodiment, the second coating layer is essentially constituted of the viscosity-enhancing compound and of the anti-agglomerating compound.

The Pellets

According to the invention, the bitumen that is solid at ambient temperature is conditioned in a divided form, i.e. in the form of small-sized units, referred to as pellets or particles, including a bitumen-based core and an envelope or shell or covering or coating layer or coating.

Preferably, the solid bitumen pellets according to the invention may have, within the same population of pellets, one or more shapes chosen from a cylindrical, spherical or ovoid shape. The size of the bitumen pellets is such that the longest mean dimension is preferably less than or equal to 30 mm, more preferentially from 5 to 30 mm and even more preferentially from 5 to 20 mm. The size and shape of the bitumen pellets may vary according to the manufacturing process employed. For example, the use of a die makes it possible to control the manufacture of pellets of a chosen size. Screening makes it possible to select pellets as a function of their size.

Preferably, the bitumen pellets according to the invention have a weight ranging from 1 mg to 5 g, preferably from 10 mg to 4 g and more preferentially from 50 mg to 2 g.

Without being bound to the theory, the Applicant has discovered, unexpectedly, that the coating layer made of second bituminous material according to the invention makes it possible to obtain a coating layer:

which is resistant to climatic conditions and to the transportation and/or storage conditions of the solid road bitumen, which breaks easily under the effect of mechanical shear, for instance under the effect of mechanical shear applied in a tank such as a mixer or a mixing drum during the manufacture of bituminous mixes, which liquefies easily on contact with the hot granulates used during the manufacture of bituminous mixes.

More particularly, the coating layer(s) withstand(s) the transportation and/or storage and/or manipulation of the bitumen at ambient temperature in "big bags" while at the same time being suitable for the manufacture of bituminous mixes. They allow the release of the core made of first bituminous material during the manufacture of bituminous mixes under the effect of mechanical shear and/or by liquefying on contact with the hot granulates.

According to a particularly preferred embodiment of the invention, the solid bitumen has:
- a core made of a first bituminous material comprising at least one bitumen base, and
- a coating layer made of a second bituminous material comprising:
  - at least one bitumen base and at least one chemical additive chosen from: an organic compound, a viscosity-enhancing compound, a paraffin, a polyphosphoric acid, and mixtures thereof; or
  - at least one pitch with a ring and ball softening point (RBSP) of greater than or equal to 80° C., it being understood that the RBSP is measured according to the standard EN 1427; or
- a mixture of such materials.

Advantageously, the solid bitumen has:
- a core made of a first bituminous material comprising at least one bitumen base, and
- a coating layer made of a second bituminous material comprising:
  - at least one chemical additive chosen from an organic compound, a viscosity-enhancing compound, a paraffin, a polyphosphoric acid, and mixtures thereof, and
  - at least one bitumen base, or at least one pitch with a ring and ball softening point (RBSP) of greater than or equal to 80° C., it being understood that the RBSP is measured according to the standard EN 1427, or a mixture thereof.

According to a particular embodiment of the invention, the additive present in the first bituminous material and the additive present in the second bituminous material are identical.

According to an even more advantageous embodiment, the solid bitumen is essentially constituted of:
- a core made of a first bituminous material constituted of a bitumen base, and
- a coating layer made of a second bituminous material comprising:
  - at least one bitumen base and at least one chemical additive chosen from: an organic compound, a viscosity-enhancing compound, a paraffin, a polyphosphoric acid, and mixtures thereof; or
  - at least one pitch with a ring and ball softening point (RBSP) of greater than or equal to 80° C., it being understood that the RBSP is measured according to the standard EN 1427; or
- a mixture of these materials.

Process for Manufacturing the Pellets:

Another subject of the invention relates to a process for manufacturing a bitumen that is solid at ambient temperature in the form of pellets composed of a core made of a first bituminous material and of a coating layer made of a second bituminous material, this process comprising:
i) the forming of the core from the first bituminous material,
ii) the forming of the coating layer made of the second bituminous material on all or part of the surface of the core.

Preferably, the forming step ii) is performed by dipping, spraying, coextrusion, etc.

According to a particular mode of the invention, the process also comprises step iii) of forming of the second coating layer on all or part of the surface of the first coating layer obtained in step ii).

The forming of the core of the pellets according to the invention from a first bituminous material comprising at least one bitumen base optionally supplemented with at least one chemical additive may be performed according to any known process, for example according to the manufacturing process described in U.S. Pat. No. 3,026,568, WO 2009/153324 or WO 2012/168380. According to a particular embodiment, the forming of the solid bitumen core may be performed by draining, in particular with the aid of a drum.

Other techniques may be used in the process for manufacturing the solid bitumen core, in particular molding, pelletizing, extrusion, etc.

Preferably, the particles of solid bitumen core have a longest mean dimension ranging from 1 to 20 mm, advantageously from 4 to 12 mm.

Another subject of the invention is a bitumen that is solid at ambient temperature in the form of pellets that may be obtained by performing the process according to the invention as described above. Such a solid bitumen in the form of pellets advantageously has the properties described above.

Uses of the Solid Bitumen Pellets:

Another subject of the invention also relates to the use of the pellets of bitumen that is solid at ambient temperature according to the invention as described above, as road binder.

The road binder may be employed for manufacturing bituminous mixes, in combination with granulates according to any known process.

Preferably, the bitumen that is solid at ambient temperature according to the invention is used for the manufacture of bituminous mixes.

Bituminous mixes are used as materials for the construction and maintenance of road foundations and of their coating, and also for performing all roadway works. Examples that may be mentioned include surface dressings, hot bituminous mixes, cold bituminous mixes, cold cast bituminous mixes, emulsion gravels, base courses, tie coats, tack coats and wearing courses, and other combinations of a bituminous binder and of the road granulate having particular properties, such as rutting-resistant courses, draining bituminous mixes, or asphalts (mixture between a bituminous binder and granulates such as sand).

Preferentially, a bituminous mix comprises:
from 3% to 10% by mass of a bituminous binder, and
from 90% to 97% by mass of granulates,
the percentages being expressed relative to the total mass of the bituminous mix.

For the purposes of the invention, the term "granulates" means mineral charges such as fines, sand or gravel, but also synthetic charges.

The mineral charges are constituted of fines or fillers (particles less than 0.063 mm in size), sand (particles between 0.063 mm and 2 mm in size) and optionally gravel (particles greater than 2 mm in size, preferably between 2 mm and 4 mm).

The fines or fillers, sands and gravels are granulates preferably corresponding to the specifications of the standard NF EN 13043. A granulate may be natural, artificial or recycled. Natural granulate is a granulate of mineral origin which has not undergone any transformation other than mechanical. Artificial granulate is a granulate of mineral origin resulting from an industrial process comprising thermal or other transformations. Granulates are generally referred to in terms of the lower dimension (d) and the upper dimension (D) of 25 screens, expressed in the form "d/D" corresponding to the granular category. This designation acknowledges that some grains can be retained on the upper screen (retained over D) and that others can pass through the lower screen (passing at d). Granulates are grains with dimensions of between 0 and 125 mm. Fines and similarly fillers are a granular fraction of a granulate which passes through the 0.063 mm screen. Filler is a granulate for which most of the grains pass through the 0.063 mm screen and which may be added to construction materials to give them certain properties. Sands are 0/2 granulates according to the standard NF EN 13043 for bituminous mixes. Gravels are granulates for which d>2 mm and D<45 mm according to the standard NF EN 13043 for bituminous mixes and dressings.

According to the invention, the fines are of any mineral nature. They are preferably chosen from fillers of limestone type. The particle size of the fines according to the invention is preferably less than 63 μm.

According to the invention, the sands are preferably chosen from semi-crushed or rolled sands. The particle size of the sands according to the invention is preferably between 63 μm and 2 mm.

According to the invention, the gravels are chosen from gravels of any geological nature with a density of greater than 1.5. Preferably, the particle size of the gravels according to the invention is between 2 mm and 14 mm. The gravels are preferably chosen from the particle sizes 2/6, 4/6, 6/10 and 10/14.

Another subject of the invention relates to a process for manufacturing bituminous mixes comprising at least one road binder and granulates, the road binder being chosen from the bitumens according to the invention, this process comprising at least the steps of:

heating the granulates to a temperature ranging from 100° C. to 180° C., preferably from 120° C. to 160° C.,
mixing the granulates with the road binder in a tank such as a mixer or a mixing drum,
obtaining bituminous mixes.

The process of the invention has the advantage of being able to be performed without a preliminary step of heating the solid bitumen pellets.

The process for manufacturing bituminous mixes according to the invention does not require a step of heating of the solid bitumen pellets before mixing with the granulates, since, on contact with the hot granulates, the bitumen that is solid at ambient temperature melts.

The bitumen that is solid at ambient temperature according to the invention as described above has the advantage of being able to be added directly to the hot granulates, without having to be melted prior to mixing with the hot granulates.

Preferably, the step of mixing of the granulates and of the road binder is performed with stirring, and stirring is then maintained for not more than 5 minutes, preferably not more than 1 minute to allow the production of a homogeneous mixture.

The solid bitumen in the form of pellets according to the present invention is noteworthy in that it allows the transportation and/or storage of road bitumen at ambient temperature under optimum conditions, in particular without there being any agglomeration and/or adhesion of the solid bitumen during its transportation and/or its storage, even when the ambient temperature is high. Moreover, the coating layer(s) of the pellets break(s) under the effect of the contact with the hot granulates and of shear, and release(s) the bitumen base. Finally, the presence of the coating layer(s) in the mixture of road binder and of granulates does not degrade the properties of said road bitumen for a road application, when compared with an uncoated bitumen base.

Process for Transporting and/or Storing and/or Manipulating Road Bitumen

Another subject of the invention also relates to a process for transporting and/or storing and/or manipulating road bitumen, said road bitumen being transported and/or stored and/or manipulated in the form of bitumen pellets that are solid at ambient temperature.

Preferably, the road bitumen is transported and/or stored at a high ambient temperature for a period of more than or equal to 2 months, preferably 3 months. Preferably, the high ambient temperature is from 20° C. to 90° C., preferably from 20° C. to 80° C., more preferentially from 40° C. to 80° C. and even more preferentially from 40° C. to 60° C.

The bitumen pellets according to the invention have the advantage of conserving their divided form, and thus of being able to be manipulated, after storage and/or transportation at a high ambient temperature. They in particular have the capacity of flowing under their own weight without undergoing creep, which allows them to be stored in conditioning in bags, drums or containers of all forms and of all volumes, followed by their transfer from this conditioning into equipment, such as worksite equipment (tank, mixer, etc.).

The bitumen pellets are preferably transported and/or stored in bulk in 1 kg to 100 kg or 500 kg to 1000 kg bags commonly known in the field of road bitumens as "big bags", said bags preferably being made of hot-melt material. They may also be transported and/or stored in bulk in 5 kg to 30 kg cartons or in 100 kg to 200 kg drums.

The various embodiments, variants, preferences and advantages described above for each of the subjects of the invention apply to all the subjects of the invention and may be taken separately or in combination.

The invention is illustrated by the following examples, which are given without any implied limitation.

EXAMPLES

Materials and Methods

The rheological and mechanical features of the bitumens to which reference is made in these examples are measured in the manner indicated in table 1.

TABLE 1

| Property | Abbreviation | Unit | Measuring standard |
| --- | --- | --- | --- |
| Needle penetrability at 25° C. | $P_{25}$ | 1/10 mm | NF EN 1426 |
| Ring and ball softening point | RBSP | ° C. | NF EN 1427 |

The variation in ring and ball softening point (RBSP) is measured according to the standard NF EN 1427 between the sample extracted from the top part of the sample tube and the sample extracted from the bottom part of the sample tube.

Bitumens $B_3$ and $B_4$ are prepared using:

Bitumen Bases:
- a bitumen base of grade 50/70, denoted $B_1$, having a penetrability $P_{25}$ of 55¹/₁₀ mm and an RBSP of 49.6° C. and commercially available from the TOTAL group under the brand name AZALT®;
- a bitumen base of grade 35/50, denoted $B_2$, having a penetrability $P_{25}$ of 41¹/₁₀ mm and an RBSP of 52° C.;

Additives:
Additive A1 of formula (V): sebacic acid;
Additive A2 of formula (II): 2',3-bis[[3-[3,5-di-tert-butyl-4-hydroxyphenyl]propionyl]]propionohydrazide known under the name Irganox MD1024® available from CIBA.

TABLE 2

| Bitumen | $B_3$ | $B_4$ |
|---|---|---|
| Bitumen base $B_1$ | 98.5% | — |
| Bitumen base $B_2$ | — | 99.25% |
| Additive A1 | 1.5% | — |
| Additive A2 | — | 0.75% |
| $P_{25}$ (1/10 mm) | 27 | 29 |
| RBSP (° C.) | 93 | 99 |

The bitumens are prepared in the following manner:

The unsupplemented bitumen base is introduced into a reactor and is maintained at 160° C. with stirring at 300 rpm for 2 hours. The additive is then introduced into the reactor and the whole is maintained at 160° C. with stirring at 300 rpm for 1 hour.

The mass percentage amounts used for each bitumen and the rheological and mechanical features are indicated in table 2 below.

In the examples that follow, the core of the pellets is constituted of bitumen $B_3$ and the coating layer is constituted of bitumen $B_4$.

1. Preparation of the Solid Bitumen Pellets $G_1$ 1.1 General Method for Preparing the Bitumen Pellets According to the Invention The supplemented bitumen base $B_4$ is heated at 160° C. for 2 hours in an oven. The supplemented bitumen base $B_4$, heated beforehand, is then poured into silicone molds having various spherical holes, and imprints are then applied directly on the molds filled with bitumen so as to obtain bitumen coating layers in the form of hollow half-spheres. After having observed the solidification of the bitumen in the mold, the surplus is levelled off using a blade heated with a Bunsen burner. After 30 minutes, the coating layer formed is removed from the mold. The coating layer made of bitumen is then allowed to cool to ambient temperature for 10 to 15 minutes.

Each of the coating layers of solid bitumen obtained in the form of a hollow half-sphere is then filled at ambient temperature with the supplemented bituminous material $B_3$. The half-spheres thus filled are then sealed in pairs using a preheated spatula so as to obtain a bitumen that is solid at ambient temperature in the form of pellets according to the invention comprising a bitumen core and a bitumen coating layer.

The solid bitumen pellets $G_1$ according to the invention were prepared according to the general method 1.1 described above. The compositions of these pellets are described in table 2.

The solid bitumen pellets $G_1$ according to the invention have a size of 4 to 10 mm.

Test of Static Strength of the Pellets $G_1$

The aim of this test is to simulate the crushing strength of pellets contained in an 800 kg big bag placed on a 1.21 m² pallet. For the purpose of representing this test at the laboratory scale, a 208 g mass is applied to a surface of a piston 2 cm in diameter.

The laboratory assembly is constituted of a syringe containing the pellets, on which is installed a box filled with granulates for a mass of 208 g. The whole is placed in an oven set at 40° C. for 24 hours. After each test, the piston is removed and the compression strength of the pellets is evaluated visually, in particular their appearance and their capacity for agglomerating. The observations are collated in table 3 below.

TABLE 3

| Pellets | $G_1$ |
|---|---|
| Heat resistance at 40° C. | +++ |

+++: the pellets keep their initial shape and do not adhere together.
++: the pellets do not adhere together, but no longer have their rounded shape.
+: the pellets adhere together slightly.
−: the pellets are quite molten.
−−: the pellets are molten.

The pellets $G_1$ according to the invention show very good resistance to an ambient temperature of 40° C. insofar as they do not adhere together and they keep their initial shape. Thus, the manipulation and transportation/storage of said pellets $G_1$ will be easy insofar as the pellets do not melt and do not agglomerate together at high ambient temperature.

Test of Dynamic Load Strength of the Pellets

This test is performed in order to evaluate the load strength of the pellets $G_1$ at a temperature of 40° C. under a compressive load. Specifically, this test makes it possible to simulate the temperature and compression conditions of the pellets on each other, to which they are subjected during transportation and/or storage in bulk in 10 to 30 kg bags or in 500 to 1000 kg big bags or in 200 kg drums, and to evaluate their strength under these conditions.

The load strength test is performed using a texture analyzer sold under the name LF Plus® by the company LLOYD Instruments and equipped with a heat chamber. To do this, a metal container 25 mm in diameter containing a mass of 10 g of bitumen pellets is placed inside the heat chamber set at a temperature of 40° C. for 3 hours. The piston of the texture analyzer is a cylinder 20 mm in diameter and 60 mm long. The cylindrical piston is, at the start, placed in contact with the upper layer of the pellets. Next, it is moved vertically downward, at a constant speed of 0.5 mm/min over a calibrated distance of 5 mm so as to exert a compression force on all of the pellets placed in the container. After removing the piston, the compression strength of the pellets is evaluated visually, in particular their appearance and their capacity for agglomerating. The observations are collated in table 4 below.

TABLE 4

| Pellets | $G_1$ |
|---|---|
| Load strength at 40° C. | ++ |

+++: the pellets keep their initial shape and do not adhere together.
++: the pellets do not adhere together, but no longer have their rounded shape.
+: the pellets adhere together slightly.
−: the pellets are quite molten.
−−: the pellets are molten.

The pellets $G_1$ according to the invention show very good load strength at 40° C. insofar as they do not adhere together and they remain separate.

The invention claimed is:

1. A bitumen that is solid at ambient temperature in the form of pellets comprising a core made of a first bituminous material and a coating layer made of a second bituminous material, in which:
the first bituminous material comprises at least one bitumen base, and
the second bituminous material comprises:
at least one bitumen base, or at least one pitch with a ring and ball softening point (RBSP) of greater than or equal to 80° C., wherein the RBSP is measured according to standard EN 1427, or a mixture of these materials, and at least one chemical additive chosen from:
an organic compound of general formula (II):

$$R-(NH)_n CONH-(X)_m-NHCO(NH)_n-R' \qquad (II),$$

in which:
the groups R and R', which may be identical or different, contain a saturated or unsaturated, linear, branched or cyclic hydrocarbon-based chain, comprising from 1 to 22 carbon atoms, which is optionally substituted, and optionally comprising heteroatoms, rings and/or heterocycles;
the group X contains a saturated or unsaturated, linear, branched or cyclic hydrocarbon-based chain, comprising from 1 to 22 carbon atoms, which is optionally substituted, and optionally comprising heteroatoms, rings and/or heterocycles;
n and m are integers having a value of 0 or 1, independently of each other, and
an organic compound of general formula (V):

$$R''-(COOH)_z \qquad (V),$$

wherein R'' represents a linear or branched, saturated or unsaturated hydrocarbon-based chain comprising from 4 to 68 carbon atoms, and z is an integer ranging from 2 to 4.

2. The bitumen as claimed in claim 1, wherein the first bituminous material comprises at least one chemical additive chosen from: an organic compound of the general formula (II), an organic compound of the general formula (V), a viscosity-enhancing compound, a paraffin, a polyphosphoric acid, and mixtures thereof.

3. The bitumen as claimed in claim 2, wherein the chemical additive present in the first bituminous material and the additive present in the second bituminous material are identical.

4. The bitumen as claimed in claim 1, wherein the chemical additive is the organic compound of general formula (II):

$$R-(NH)_n CONH-(X)_m-NHCO(NH)_n-R' \qquad (II),$$

in which:
the groups R and R', which may be identical or different, contain a saturated or unsaturated, linear, branched or cyclic hydrocarbon-based chain, comprising from 1 to 22 carbon atoms, which is optionally substituted, and optionally comprising heteroatoms, rings and/or heterocycles;
the group X contains a saturated or unsaturated, linear, branched or cyclic hydrocarbon-based chain, comprising from 1 to 22 carbon atoms, which is optionally substituted, and optionally comprising heteroatoms, rings and/or heterocycles;
n and m are integers having a value of 0 or 1, independently of each other.

5. The bitumen as claimed in claim 2, wherein the chemical additive in the first bituminous material is the organic compound of general formula (V):

$$R''-(COOH)_z \qquad (V),$$

wherein R'' represents a linear or branched, saturated or unsaturated hydrocarbon-based chain comprising from 4 to 68 carbon atoms, and z is an integer ranging from 2 to 4.

6. The bitumen as claimed in claim 1, wherein the second bituminous material has a needle penetrability measured at 25° C. according to the standard EN 1426 of greater than 5 1/10 mm.

7. The bitumen as claimed in claim 1, wherein the first bituminous material has a needle penetrability measured at 25° C. according to the standard EN 1426 of between 10 and 850 1/10 mm.

8. A process of manufacturing the bitumen of claim 1, wherein the bitumen is solid at ambient temperature in the form of pellets comprising a core made of a first bituminous material and a coating layer on all or part of a surface of the core, the coating layer made of a second bituminous material, the process comprising:
i) forming the core from the first bituminous material, and
ii) forming the coating layer made of the second bituminous material on all or part of the surface of the core.

9. The bitumen as claimed in claim 1, which is obtained by a process comprising:
i) forming the core from the first bituminous material, and
ii) forming the coating layer made of the second bituminous material on all or part of a surface of the core.

10. The bitumen as claimed claim 1, which shows stability on transportation and storage at a temperature ranging from 20 to 80° C. for a period of more than or equal to two months.

11. The bitumen as claimed claim 10, which shows stability on transportation and storage at a temperature ranging from 20 to 80° C. for a period of more than or equal to three months.

12. The bitumen as claimed in claim 1 which is a road binder.

13. A process for transporting and/or storing road bitumen, wherein said process comprises
a step consisting in the preparation of the road bitumen in the form of bitumen that is solid at ambient temperature as claimed in claim 1, and
a step wherein said road bitumen is transported and/or stored.

14. The bitumen as claimed in claim 4, wherein the organic compound of general formula (II) is chosen from
$C_5H_{11}$—CONH—NHCO—$C_5H_{11}$,
$C_9H_{19}$—CONH—NHCO—$C_9H_{19}$,
$C_{11}H_{23}$—CONH—NHCO—$C_{11}H_{23}$,
$C_{17}H_{35}$—CONH—NHCO—$C_{17}H_{35}$,
$C_{21}H_{43}$—CONH—NHCO—$C_{21}H_{43}$,
$C_{17}H_{35}$—CONH—$CH_2$—$CH_2$—NHCO—$C_{17}H_{35}$, and
$C_{12}H_{25}$—NHCONH—$C_6H_4$—$CH_2$—$C_6H_4$—NHCONH—$C_{12}H_{25}$.

15. The bitumen as claimed in claim 4, wherein the organic compound of general formula (II) is 2',3-bis[[3-[3,5-di-tert-butyl-4-hydroxyphenyl]propionyl]]propionohydrazide.

16. The bitumen as claimed in claim 5, wherein the organic compound of general formula (V) is selected from diacids having the general formula HOOC—$C_wH_{2w}$—COOH wherein w an integer ranging from 4 to 22.

17. The bitumen as claimed in claim 16, wherein the organic compound of general formula (V) is sebacic acid.

* * * * *